G. W. NEVILL.

Grain-Drill.

No. { 1,074, 32,078. }

Patented Apr. 16. 1861.

Witnesses:

Inventor:

UNITED STATES PATENT OFFICE.

GEORGE W. NEVILL, OF BATH, ILLINOIS.

IMPROVEMENT IN SEED-DRILLS.

Specification forming part of Letters Patent No. 32,078, dated April 16, 1861.

*To all whom it may concern:*

Be it known that I, GEORGE W. NEVILL, of Bath, in the county of Mason and State of Illinois, have invented new and useful Improvements in a Machine for Sewing Grain in Drills; and I do hereby declare that the following is a full and exact description of the construction and operation of the same, reference being had to the annexed drawings, making a part of this specification, in which—

Figure 1:
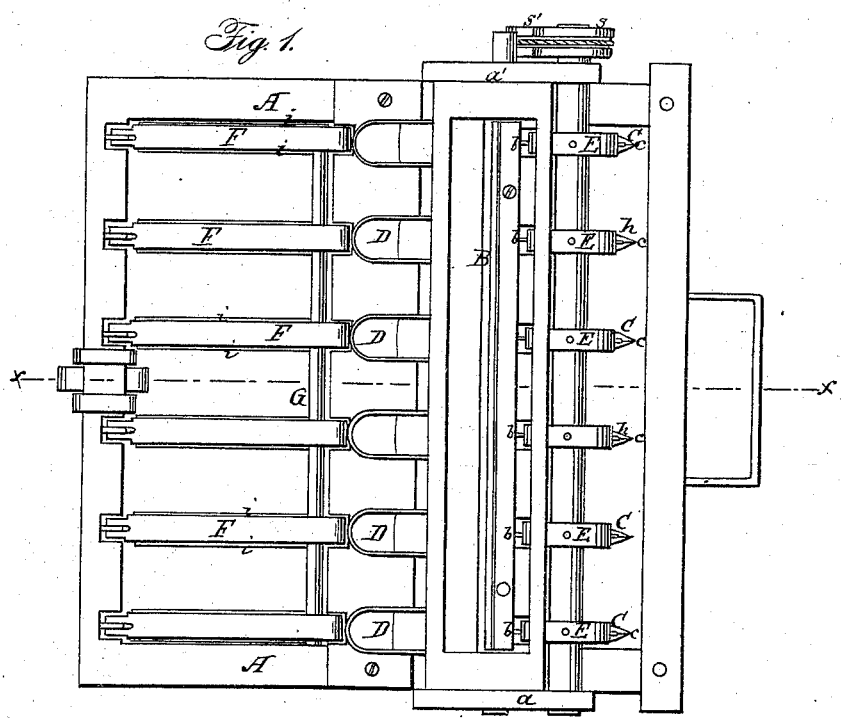
Figure 2:
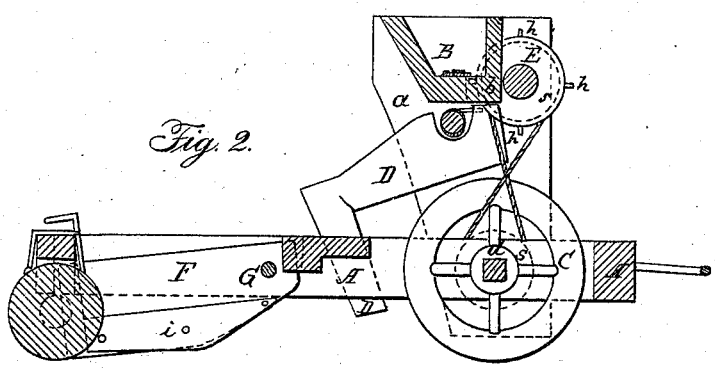

Figure 1 is a plan view of my improved seed-drill. Fig. 2 is a vertical section on the line $xx$.

Similar characters of reference in the several figures denote the same part.

The nature of my invention consists of a peculiar arrangement of parts, as hereinafter to be described.

To enable others to make and use my said drill, I will proceed to describe it, as follows:

In the drawings, A represents the frame. Supported between the upright side pieces, $a$ $a'$, is the hopper B, provided with a series of openings, $b$.

C represents a series of cast-iron wheels twenty inches in diameter, with fellies four inches deep, having beveled edges, which edges are tipped with steel-plate and run to a sharp point, as shown at $c$, Fig. 1. These wheels are fixed upon a shaft, $d$, at a distance of nine inches apart, said shaft having its bearing in the frame A. These wheels make indentures in the ground, into which the grain is to be deposited.

D is a series of cast-iron tubes or conveyers, which convey the seed from the hopper to the indentures made by the wheel $c$.

E represents wheels upon a shaft, $e$, having its bearing in the uprights $a$ $a'$. These wheels are six inches in diameter and one inch wide, and have on their periphery four small iron spurs or projections, $h$, one-fourth of an inch in length, these wheels being so situated as that a portion of their outer surface moves through the openings $b$ in the hopper, and thereby agitate and cause the grain therein to pass through the openings $b$, and, falling into the conveyers D, pass from thence to the drills behind the wheels C. In the rear of the wheels C and tubes D is a series of adjustable shoes or coverers, F, two feet long, one foot wide, and two inches thick, but tapering back to one inch in thickness. Attached to the either sides of said shoes are plates $i$, which extend below the shoe from the point touching the ground to within six inches of the heel, and effectually cover the grain, when the heel of the shoe, passing over the grain, smooths and presses down the soil upon the same. These shoes have their movement upon an iron rod, G, and are thereby capable of a self-adjustment to the inequalities of the ground.

The operation of the drill is as follows: Grain being placed in the hopper B, the machine is drawn forward, when the wheels C make the desired indentures in the soil, and by reason of pulley-connection $s$ $s'$ cause the wheels E to revolve in an opposite direction, which causes the desired quantity of grain to pass through the openings $b$, and, falling upon the conveyers D, pass from thence to the drills made by the wheels C, when the shoes F pass over and effectually cover the grain and press down the soil upon the same.

Having thus described my invention, what I claim, and desire to secure by Letters Patent, is—

The wheels C and the wheels E, being fixed upon shafts, hopper B, conveyers D, and shoes F, the whole arranged and operating as herein set forth.

GEORGE W. NEVILL.

Witnesses:
LUTHER DEARBORN,
J. F. COPPEL.